July 19, 1938.  F. A. HAYES  2,124,399
POWER TRANSMISSION MECHANISM
Filed Nov. 27, 1935  3 Sheets-Sheet 2
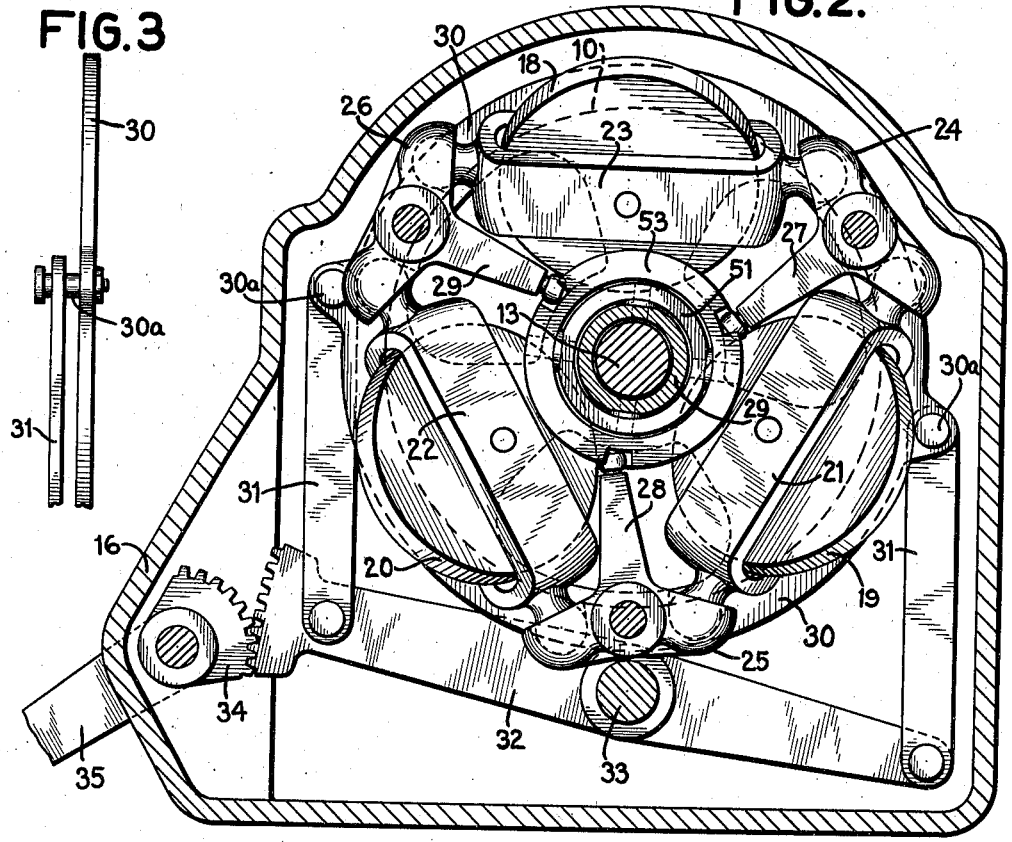
INVENTOR
FRANK A. HAYES
BY
Cooper, Kerr & Dunham
ATTORNEYS July 19, 1938.  F. A. HAYES  2,124,399
POWER TRANSMISSION MECHANISM
Filed Nov. 27, 1935  3 Sheets-Sheet 3
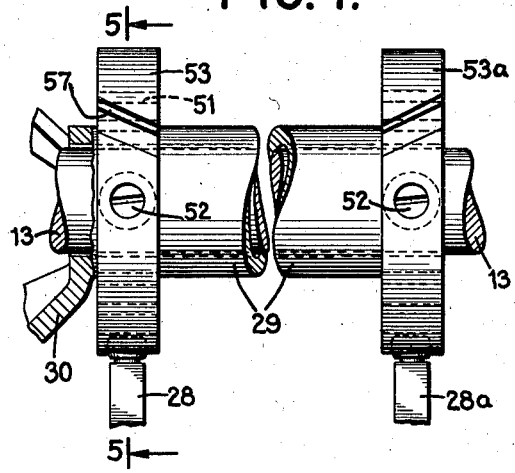
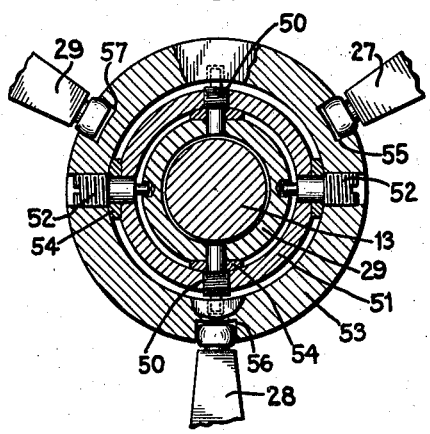
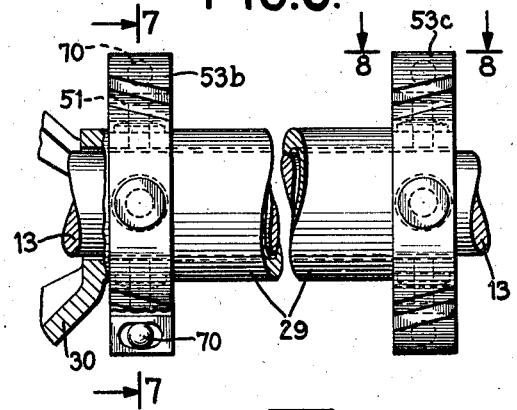
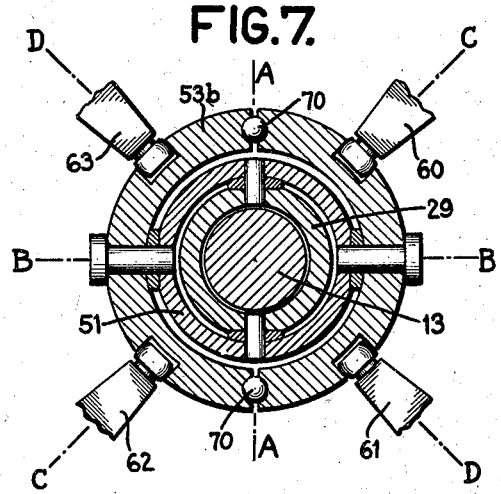
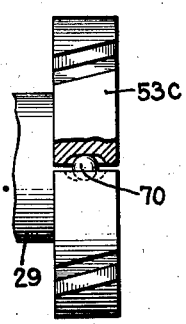
INVENTOR
*FRANK A. HAYES*
BY
*Cooper, Kerr & Dunham*
ATTORNEY Patented July 19, 1938

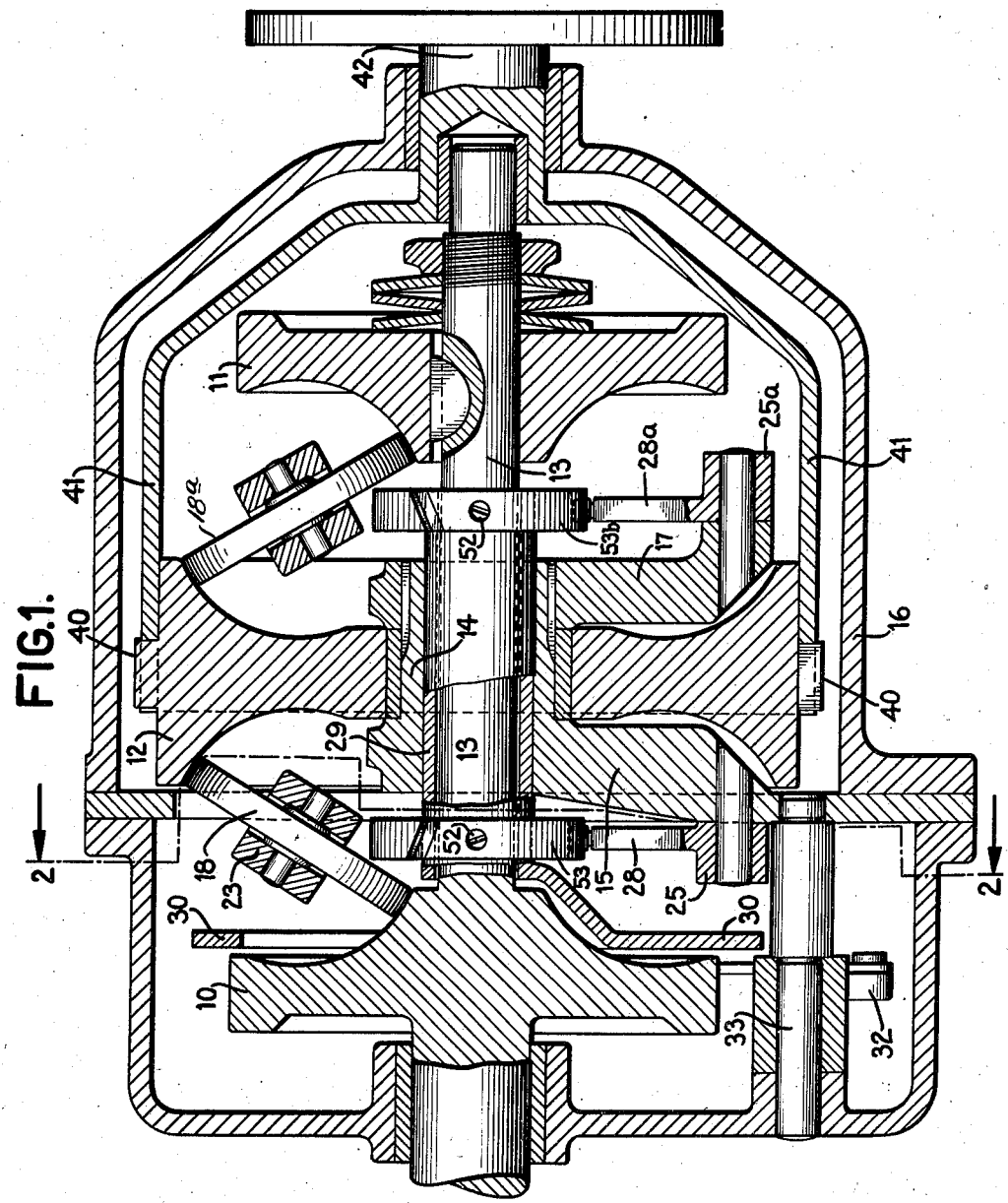

2,124,399

UNITED STATES PATENT OFFICE 2,124,399

POWER TRANSMISSION MECHANISM

Frank A. Hayes, Middletown, N. J.

Application November 27, 1935, Serial No. 51,761
In Great Britain November 30, 1935

9 Claims. (Cl. 74—200)

In variable speed power transmission mechanisms of the toric disk and friction roller class, the changes of speed ratio between the driving and driven elements are produced by varying the angularity of the rollers with respect to the planes of the disks. The mechanism may be of the so-called "simplex" type, in which two coaxial disks and a single "set" of interposed rollers, two or more in number, are employed, or of the "duplex" type, having three disks and two sets of rollers. In both types the speed ratio changes, that is, changes of roller angularity, are commonly effected by precession of the rollers on axes (the axes of precession) transverse to their axes of rotation. It is known that in such mechanisms a roller can be caused to precess, from one speed ratio position to another, by displacing it bodily in a direction transverse to its axis of rotation, or by tilting it about the diameter extending between its points of contact on the disks, or by a combination of both such movements, and numerous constructional forms are known for supporting the rollers and for giving them the relatively slight movement (displacement, tilt, or both) necessary to initiate the precession. In all cases it is of prime importance that in every speed ratio position the angularity of the rollers be uniform, for if one roller is at a different angle it will tend to drive at a different speed ratio, with consequent slippage of one or more rollers on the disks and resultant wear on rollers or disks or both. Further, unless all the roller angularities are uniform the load on the apparatus is not equally divided among the rollers and the efficiency of operation is thereby lessened. In general the desired uniformity of speed ratio position can be obtained by precision in construction and assembly of the parts involved, but this entails considerable cost, and the initial high degree of accuracy is liable to impairment by wear. Accordingly various methods have been devised by which the rollers can be automatically "equalized" in their speed ratio positions or angles, and the load equally divided among them, in a mechanism which is not initially constructed with precision workmanship or in which the original accuracy of construction has been impaired by wear. It thus becomes practical to build the transmission mechanisms with considerable tolerances in size and fitting of the parts, these initial tolerances, and subsequent wear, being compensated for by the action of the equalizing means.

The equalizing means commonly employed comprises a device which is capable of radial movement in all directions for the purpose of equalizing the rollers of a set and which, in a duplex mechanism, is also capable of axial movement for the purpose of equalizing the two sets of rollers. The equalizing device may also, if desired, be a part of the speed-ratio control mechanism by which precession of the rollers is initiated for change of speed ratio.

The present invention relates to the equalization of the rollers, and its chief object is to provide improved means, capable of use in disk and roller transmission mechanisms generally, by which equalization of the rollers of a set can be effected without radial movement of the equalizing device. Another object is to provide a device by which a set of four rollers can be equalized. To this and other ends the invention comprises the novel features of construction and combinations of elements hereinafter described. The invention can be embodied in a wide variety of transmission mechanisms of the disk and roller type, and in the accompanying drawings I have illustrated the invention as embodied in a duplex mechanism, of a type in which the equalizing device, by connection with and actuation by the speed-ratio control means, serves to give to the rollers the bodily displacement or tilting movement, or both, necessary to cause precession of the rollers for change of speed ratio.

Referring now to the drawings:

Fig. 1 is a longitudinal section of the transmission mechanism.

Fig. 2 is a cross-section on the line 2—2 in Fig. 1.

Fig. 3 is a detail side view of the control annulus or ring and one of the links connecting the same to a control lever.

Fig. 4 is a detail side view of an equalizing member adapted for use with a duplex transmission having three rollers in each set, spaced axially apart.

Fig. 5 is a cross-section on the line 5—5 of Fig. 4.

Fig. 6 is a detail side view, partly in section, of an equalizing device adapted for use in a duplex mechanism having four rollers in each set.

Fig. 7 is a cross-section on the line 7—7 of Fig. 6.

Fig. 8 is a detail plan view indicated by the line 8—8 of Fig. 6.

Referring first to Figs. 1 and 2, the three coaxial disks are shown at 10, 11, 12, end disks 10 and 11 being connected with shaft 13 to rotate therewith and middle disk 12 being mounted to rotate on a hub 14 surrounding shaft 13 and extending from a spider 15 fastened between the two parts of the housing 16, the other end of the hub carrying the spider 17. The precessing rollers 18, 19, 20, Fig. 2, are journaled in carriers 21, 22, 23, mounted in the rockers 24, 25, 26, by means of ball and socket joints, the rockers being pivoted on the spider and provided with arms 27, 28, 29, extending radially inward into cam slots in the adjacent equalizing ring, as hereinafter described. The rollers of the other set are similarly mounted, one roller being shown at 18a, Fig. 1, and the rocker of another being shown at 25a, with its arm 28a extending into a cam slot in the appropriate equalizing ring. The two equalizing rings are carried by a sleeve 29 extending through and supported by the hub 14 with which it has a smooth fit to permit easy rotary and axial movement therein without radial displacement. The sleeve is connected to a control annulus or ring 30 which is itself connected by links 31 to a lever 32 fulcrumed at 33. It will be seen that rocking the lever will impart a rotary movement to the sleeve 29, thereby rocking the rockers and causing the rollers to precess to a higher or lower speed-ratio position, according to the direction of movement of the sleeve 29. The lever may be rocked by a gear sector 34 mounted in the casing and connected to an actuating arm 35. Disk 12 is connected by teeth 40 to a drum 41 which is itself connected to a shaft 42 in which one end of shaft 13 is journaled. It will be readily understood that the mechanism may be driven from either end, for example from the left in Fig. 1, in which case disk 12 is the driven disk and shaft 42 is the driven shaft. If the sleeve 29 is to have any capability of axial movement, as in the case of a duplex transmission for the purpose of equalizing the two sets of rollers, the connection of the sleeve with the lever 32 is constructed to permit such movement, as for example by making the links 31 flexible, or by providing a sliding connection between the control ring 30 and the links, as in Fig. 3, in which the pivot 30a, carried by the ring, can slide through the hole in the link.

Referring now to Fig. 5, the equalizing device is shown as composed of articulated parts the inner of which is the sleeve 29, provided with diametrically opposite outwardly projecting trunnions 50 to which is pivoted an intermediate ring 51. The latter is provided with two trunnions 52 spaced 90 degrees from the trunnions 50, and to these trunnions 52 a cam ring 53 is pivoted. 54 are spacing washers. Ring 53 is provided with three equally spaced inclined or helical slots 55, 56, 57, which engage rocker arms 27, 28, 29. The forces which these rocker arms exert on the cam ring are tangential. Due to the inclination of the slots these forces have axial components, and since the ring by reason of its universal joint connection with the sleeve 29 is free to assume any angular position, and movement in the direction of any force tends to put the roller operated by the corresponding rocker into a lower speed position and so reduce its reaction, the ring will tilt to such a position that the three axial forces are equal, which means that the corresponding roller loads become equal and hence that all three rollers of a set are taking the same angular position and are assuming equal shares of the driving load.

Suitable stops may be provided, if necessary or desirable, to limit the swing of the pivoted rings. A convenient construction for the purpose is shown in Fig. 5, in which trunnions 50 are provided with fingers extending into axial slots in the ring 53, these slots being open at one end to permit removal of the ring from sleeve 29 after the trunnions 52 have been removed, the latter being equipped with fingers extending into axial slots in the sleeve 29.

The foregoing description with reference to Fig. 5 is applicable to a simplex transmission, but Fig. 4 shows how the same principles are applicable to a duplex transmission. The sleeve 29 is allowed a certain freedom of axial movement in order to bring about equalization between sets of rollers, for which purpose the rocker arm slots in the two cam rings, 53, 53a are oppositely inclined, one having a right-hand pitch and the other left-hand, or vice versa.

Figs. 6, 7 and 8 show a modification of the construction for use when it is desired to use four rollers in a set. Generally speaking, the parts are the same as in Figs. 4 and 5, but the cam rings 53b, 53c are split on a diameter A—A into two parts and there are four slots in each ring (two in each ring-half) to accommodate the four rocker arms 60, 61, 62, 63. This ring assembly can move about axis C—C to equalize loads due to rockers 63 and 61, without disturbing forces due to 60 and 62. Similarly the ring assembly can move about axis D—D to equalize loads due to rockers 60 and 62 without disturbing the equalization of 63 and 61. If, however, the loads due to rockers 63 and 61 are equal and those due to rockers 60 and 62 are also equal, and if the ring were solid, the loads due to 63 and 61 could be in amount greater or less than those due to 60 and 62, and still no movement of the cam ring would occur. In other words, with four rollers it is possible with a solid ring to equalize their loads in pairs but not to equalize the loads of the rollers in each of such pairs. With the split ring, however, if the load due to rocker 63 is greater than that due to rocker 62, the ring-half engaged by these rockers will swing about axis B—B to equalize these two, and similarly the other ring-half can swing about axis B—B to equalize the loads due to rockers 60 and 61. Thus the loads on all four rollers will be equalized.

The two halves of the cam rings 53b, 53c may be spaced apart by anti-friction balls 70, mounted in grooves in the ends of the ring-halves, as indicated in Figs. 7 and 8. These balls also serve to take tangential stresses which might otherwise tend to bind the ring-halves on the trunnions on which they swing.

It is to be understood that the invention is not limited to the forms herein specifically described but can be embodied in other forms and can be employed to advantage in other transmission mechanisms of the disk and roller type.

I claim:

1. In a transmission mechanism, in combination, coaxial toric disks, friction rollers cooperating therewith, means carrying the rollers for precession to vary the angular positions of the rollers relative to the disks, equalizing means comprising a ring coaxial with the disks, a support on which the ring is pivoted between the disks to swing on an axis transverse of the disk axis, and actuating means between the rollers and the ring and having cam connection with the latter.

2. In a transmission mechanism, in combination, coaxial toric disks, interposed precessing friction rollers cooperating with the disks to drive one from the other, supporting means for the rollers, and equalizing means comprising a radially stationary ring coaxial with the disks, a support on which said ring is pivotally mounted between the disks for universal swinging movement on axes transverse to the disk axis, and actuating means connecting the ring with said rollers and having cam connection with the former.

3. In a transmission mechanism, in combination, a shaft, toric disks spaced apart on the shaft and rotatable therewith, an intermediate friction disk between said spaced disks and rotatable about said shaft, precessing friction rollers arranged in sets between the disks to cooperate therewith, and supporting means for the rollers; and equalizing means comprising a sleeve surrounding said shaft and extending through the intermediate disk, rings universally pivoted on said sleeve on opposite sides of the intermediate disk to swing on axes transverse to the disk axis, and actuating means connecting said rings with the adjacent rollers and having cam connection with the rings.

4. In a transmission mechanism, in combination, a main shaft, coaxial toric disks thereon, cooperating friction rollers arranged in sets, and means carrying the rollers for precession; and equalizing means comprising a radially stationary axially movable sleeve surrounding said shaft, members pivoted on the sleeve to swing on axes transverse to the disk axis, and means for operatively connecting said pivoted members with the rollers.

5. In a power transmission mechanism, in combination, toric disks and cooperating friction rollers, supporting means for the rollers, equalizing means comprising a support and a cam ring mounted thereon to swing on an axis transverse to the axis of the ring, and cam-actuated means for operatively connecting the cam ring with the rollers to equalize the latter.

6. In a toric disk and friction roller transmission mechanism, in combination, an equalizing member comprising a support, a cam ring divided transversely into parts, and pivotal means carrying said parts on the support for independent swinging movement on an axis transverse to the axis of the ring.

7. In a power transmission mechanism, in combination, toric disks and cooperating friction rollers; supporting means for the rollers; equalizing means comprising a support, a ring pivotally mounted thereon to swing on an axis transverse to the axis of the ring, and a cam-ring pivotally mounted on the first ring to swing on an axis at right angles to the said first mentioned axis of the first ring; and cam-actuated means for operatively connecting the cam ring with the rollers to equalize the latter.

8. In a toric disk and friction roller transmission mechanism, an equalizing member comprising a sleeve, axially spaced rings pivotally mounted on the sleeve to swing on transverse diameters, and cam rings pivotally mounted on the first rings to swing on diameters at right angles to the said diameters of said first rings.

9. In a toric disk and friction roller transmission mechanism, an equalizing member comprising a support, an intermediate ring pivoted at opposite ends of a diameter thereof, and a cam ring divided in halves, said halves pivotally mounted on the intermediate ring to swing independently of each other on an axis transverse to the axis of the intermediate ring.

FRANK A. HAYES.